United States Patent [19]
Nagata

[11] 3,929,834
[45] Dec. 30, 1975

[54] 3-ISOCHROMANONE DERIVATIVES
[75] Inventor: Wataru Nagata, Nishinomiya, Japan
[73] Assignee: Shionogi & Co., Ltd., Osaka, Japan
[22] Filed: June 13, 1974
[21] Appl. No.: 479,256

[30] Foreign Application Priority Data
June 26, 1973 Japan.............................. 48-72057

[52] U.S. Cl.... 260/343.2 R; 260/289 R; 260/289 A; 260/559 R
[51] Int. Cl.²...................................... C07D 311/20
[58] Field of Search .............................. 260/343.2 R

[56] References Cited
UNITED STATES PATENTS
3,480,634  11/1969  Finkelstein...................... 260/343.2

OTHER PUBLICATIONS
Fieser et al., Organic Chem., 3rd Ed., (1956), pp. 138, 225.

Primary Examiner—James A. Patten
Attorney, Agent, or Firm—Wenderoth, Lind & Ponack

[57] ABSTRACT

A process for producing 3-isochromanone derivatives of the formula (II) useful as intermediates in the preparation of protoberberine alkaloids which comprises reacting phenylacetic acids of the formula (I) with formaldehyde or its equivalent in the presence of a boron compound, if required followed by alkylation or aralkylation.

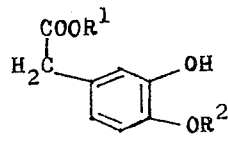

(I)

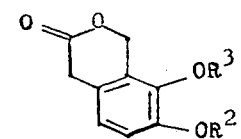

(II)

(wherein $R^1$ represents a hydrogen or a lower alkyl group, $R^2$ represents a lower alkyl group, and $R^3$ represents a hydrogen, a lower alkyl group or an aralkyl group).

8 Claims, No Drawings

3-ISOCHROMANONE DERIVATIVES

The present invention relates to 3-isochromanone derivatives. More particularly, it relates to a novel process for producing 3-isochromanone derivatives which are useful as intermediates in the preparation of protoberberine alkaloids. The process of the invention comprises reacting a compound of the general formula:

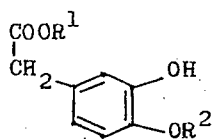

(I)

(wherein $R^1$ represents a hydrogen or a lower alkyl group; $R^2$ represents a lower alkyl group) with formaldehyde or a reactive derivative equivalent to formaldehyde in the presence of a boron compound, and then if required, alkylating or aralkylating the product to yield a compound of the general formula:

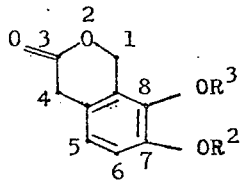

(II)

(wherein $R^2$ has the same meaning as mentioned above, and $R^3$ represents a hydrogen, a lower alkyl group or an aralkyl group).

In the prior art, the 3-isochromanone derivatives represented by the general formula (II) have been prepared by permitting the corresponding 3-hydroxy-4-methoxyphenylacetic acid (I: $R^1 = H$; $R^2 = CH_3$) to the Reimer-Tiemann reaction to introduce a formyl group at the 2-position, and then reducing the latter to cyclize to a lactone ring [A.R. Battersby et al., J.Chem.-Soc.,(C) 1052 (1966)]

This known process is, however, practically useless for preparing the objective 3-isochromanone derivatives (II) since the yield is very low (14.5 percent yield) in the step for introducing the formyl group. The present inventor had investigated many processes for introducing one carbon unit corresponding to the aforementioned formyl group to the same starting compounds (I), and as mentioned below in detail it was discovered that the reaction with formaldehyde or reactive derivatives equivalent to formaldehyde in the presence of a boron compound produced the objective isochromanone derivatives in excellent yield in only one step not through the aforementioned reduction step. The present invention was made on the basis of this fact.

The starting compounds (I) used in this invention are known ones prepared from isovaniline in good yield via the step for cyanation [Grewe and Fischer, Chem.-Ber.,96, 1520 (1963)]. In the general formula (I), the lower alkyl group as $R^1$ and $R^2$ means methyl, ethyl, propyl, isopropyl, butyl, pentyl, and the like.

The reaction for increasing a unit of carbon atom in this invention is characterized by means of using boron compounds. The preferred boron compound involves boric acid or its derivatives, for example, boric acid esters (methyl borates, ethyl borates, phenyl borates, 2-hydroxy-1,3,2-dioxaborane, and the like), tetraalkoxyboranes (bisethylene glycol borate, biscatechol borate) and the like, boronic acids or boric acids, for example, ethylboronic acid, phenylboronic acid, butylboric acid and the like, boroxines, for example, triphenylboroxine, trimethoxyboroxine, and the like, acyloxyboranes, for example, boron acetate and the like, alkoxyboranes, for example, dimethoxyborane, and the like, and alkoxyhaloboranes, for example, 2-chloro-1,3,2-dioxaborane and the like. Of these boron compounds, boric acid, boric acid esters and boronic acids are particularly preferable.

In this invention, the selective introduction of the carbon unit at the 2 position is attributable to the effect of neighboring 3-hydroxy group of the starting phenylacetic acid. In this reaction, the aforementioned boron compounds stand between the 3-hydroxy group and the carbon unit to be introduced (formaldehyde or reactive derivatives equivalent to formaldehyde) and facilitate the selective substitution of the carbon unit at the adjacent position (2-position).

The reactive derivative equivalent to formaldehyde used in this invention means formalin, paraformaldehyde, trioxane and the like. Alternatively, those which give formaldehyde in the reaction medium may be used.

The reaction may usually be carried out in an anhydrous solvent under refluxing at an elevated temperature while removing the water produced. As for a solvent, it is appropriate to use an aprotic solvent, particularly a hydrocarbon solvent such as benzene, toluene, xylene and the like in order to remove the water produced in the course of the reaction as an azeotrope. Additionally, it is also appropriate to use a drying agent such as silica gel, Molecular sieve (trade name; Linde Co.), anhydrous calcium sulfate, anhydrous calcium chloride, anhydrous magnesium sulfate and the like in order to remove water effectively.

In carrying out the reaction, the starting phenylacetic acid is permitted to the reaction with the boron compound to form the ester linkage in the 3-hydroxy groups. Then, formaldehyde or a reagent equivalent thereto is added to the above mixture to introduce the carbon unit at the 2-position. The reaction time varies with the property of the boron compound used, the solvent used and temperature, and the reaction usually terminates within a period of several hours or several ten hours. In this stage the boron compound which has participated in the reaction is still located between the 3-hydroxy group and the 2-carbon unit introduced, and accordingly it is necessary to permit the reaction product to hydrolysis or alcoholysis under slightly acidic or neutral condition. The slightly acidic condition means for example those provided with a diluted mineral acid (e.g. hydrochloric acid, hydrobromic acid, sulfuric acid, phosphoric acid), an organic acid (e.g. acetic acid, propionic acid, oxalic acid, p-toluenesulfonic acid) and so on. The reaction condition, whether it should be acidic or neutral, may optionally be fixed according to difficulty of the dissociation of the boron compound. In this hydrolysis step, it is not necessary to use any solvent, so the reaction may be carried out in an aqueous solution (when the acidic condition is required, the aforementioned acid is added) at room temperature or under heating. The alcoholysis may be conducted in an alcohol such as methanol, ethanol, propanol and the like. In this hydrolysis or alcoholysis, the boron compound which has participated in the bonding is dissociated from the 3-hydroxy group and the 2-carbon unit, and the latter dehydratively cyclizes with the carboxyl group of the adjacent acetic acid group (the 1-position) to yield a lactone ring, that is the objective 3-isochromanone (II) ($R^3 = H$). Thus resulting objective compound (II) may be isolated and purified in the conventional manners such as extraction, filtration, recrystallization, and so on.

Thus prepared 3-isochromanone derivatives (II), if required, may be permitted to alkylation or aralkylation. The alkyl or aralkyl groups ($R^3$) to be introduced are methyl, ethyl, propyl, butyl, isobutyl, pentyl, benzyl, phenethyl and the like. The alkylation or aralkylation in this invention may be carried out in a condition which has been used in the alkylation or aralkylation of the usual phenolic hydroxy group, but the reaction should carefully be conducted to avoid the breakage of the lactone ring. In view of this fact the following reaction methods can be employed: method using dialkyl sulfates (e.g. dimethyl sulfate, diethyl sulfate)(in this method, it is preferable to use a weak base such as potassium carbonate or sodium carbonate in order to avoid the breakage of the lactone ring) or method using alkyl or aralkyl halides (e.g. methyl iodide, benzyl chloride).

The 3-isochromanone derivatives (II) prepared in this invention can be converted, as mentioned in the following reaction sequence, into protoberberine alkaloids (VI) on the reaction with phenethylamines (III) yielding amides (IV) and the subsequent Bischler-Napieralski reaction yielding isoquinoline derivatives (V) followed by reductive cyclization.

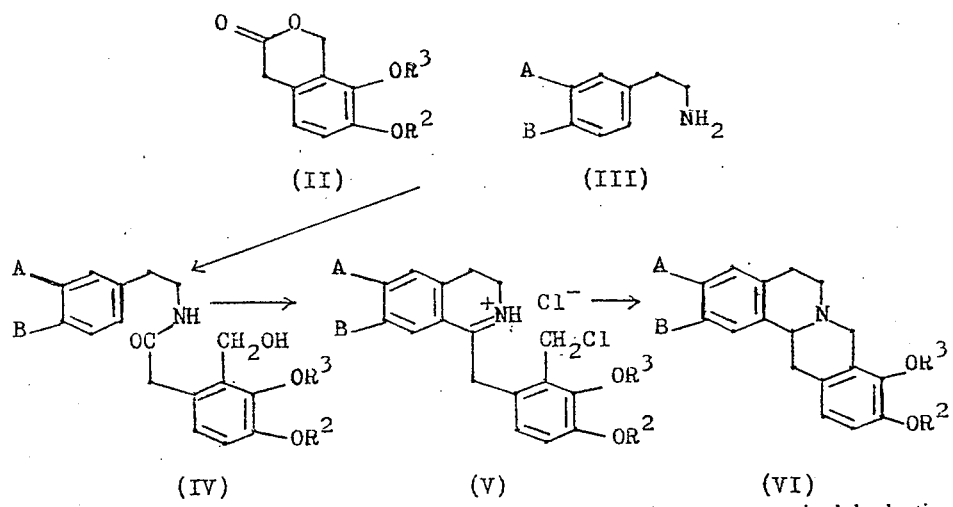

(wherein $R^2$ and $R^3$ each has the same meaning, and A and B each represents an optional substituent).

Accordingly, the 3-isochromanone derivatives (II) are useful as intermediates in the preparation of the alkaloids having the aforementioned basic structural formula, for example, berlambine, lambertine, nandinine, canadine, palmatine, columbamine, berberine, jatrorrhizine, scoulerine, cyclanoline, steponine, and the like. Particularly, they are useful in the preparation of berberine which has practically been used as an antimalarial agent or a bitter stomachic.

The invention will be explained by the following examples.

EXAMPLE 1

A suspension of 3.64 g of 3-hydroxy-4-methoxyphenylacetic acid and 1.49 g of powdery boric acid in 80 ml of anhydrous toluene is heated under refluxing with stirring for 2 hours while removing the water produced, and then, 10 ml of toluene is distilled off under usual pressure. To this mixture is then added a suspension of 0.66 g of paraformaldehyde in 25 ml of anhydrous toluene, and the mixture is heated under refluxing for 1 hour. Toluene is distilled off under reduced pressure, and to the residue is added 40 ml of methanol, heated at 60°C for 10 minutes, and distilled off under reduced pressure. This procedure is repeated twice. Thereafter, benzene is added thereto and evaporated to dryness. The resulting residue (3.68 g) is dissolved in ethyl acetate, washed with 5% sodium bicarbonate and water, and evaporated to dryness to give 1.16 g (30% yield) of 8-hydroxy-7-methoxy-3-isochromanone as crystals, which on recrystallization from acetone — hexane give colourless plates having mp. 180°–183°C. IR: $\nu_{max}^{Nujol}$ 3370, and 1728 cm$^{-1}$. $\nu_{max}^{CHCl_3}$ 3540, 1740, 1600, 1277, 1030, and 893 cm$^{-1}$. NMR: δ (d$_6$-DMSO) 3.65 (2H, singlet), 3.80 (3H, singlet), 5.32 (2H, singlet), 6.70 and 6.90 (2H, AB quartet, J = 8.0 Hz), 8.07 (1H, singlet). Anal. Calcd. for $C_{10}H_{10}O_4$ (%): C, 61.85; H, 5.19. Found (%): C, 61.70; H, 5.17.

EXAMPLE 2

A mixture of 1.95 g of 3-hydroxy-4-methoxyphenylacetic acid, 6 ml of triethyl borate and 60 ml of anhydrous benzene is heated under refluxing for 15 minutes in an azeotropic dehydration apparatus, and then 2.2 g of paraformaldehyde is added thereto in 5 portions at 1 hour intervals. Then, 3.5 ml of triethyl borate and then 0.6 g of paraformaldehyde in 2 portions are added thereto. After heating under refluxing for 1 hour, 10 ml of water is added, and the mixture is heated under refluxing for 10 minutes. After cooling, the mixture is extracted with ethyl acetate, and the extract is evaporated to dryness under reduced pressure. The resulting residue is dissolved in 30 ml of benzene and heated under refluxing together with 3 ml of acetic acid for 6 hours. The reaction mixture is evaporated to dryness under reduced pressure, and the residue is extracted with a mixture of 5% sodium bicarbonate — ethyl acetate. The alkaline layer is acidified with 2N hydrochloric acid, then extracted with ethyl acetate, and combined with the aforementioned ethyl acetate layer. This layer is condensed under reduced pressure, and the residue is recrystallized from acetone — hexane to give 1.48 g (71 percent yield) of 8-hydroxy-7-methoxy-3-isochromanone (mp. 180° – 183°C).

EXAMPLE 3

A solution of 11.0 g of 3-hydroxy-4-methoxyphenylacetic acid in 550 ml of anhydrous benzene is heated under refluxing for a while to remove moisture as azeotrope. The benzene layer becomes clear after about 1 hour, and most of water is distilled out at this stage. Thereafter, 2 – 3 g of paraformaldehyde is added at 2 – 3 hours intervals, and after 9 hours 1.0 g of phenylboronic acid and an additional amount of formaldehyde are added. After the lapse of about 20 hours, the solvent is distilled off under reduced pressure, and to the resulting crystalline residue is added 160 ml of water and heated at 80° – 95°C (bath temperature) for 1.5 hours. The precipitated crystals are collected by filtration while slightly hot, washed with a small quantity of water, dissolved in methylene chloride, washed with water, dried over anhydrous sodium sulfate, and evaporated to dryness. The resulting crystalline residue (10.0 g) is recrystallized from acetone - ether to give 9.17 g (78 percent yield) of 8-hydroxy-7-methoxy-3-isochromanone having mp. 180° – 183°C.

EXAMPLE 4

To a solution of 4.10 g of 8-hydroxy-7-methoxy-3-isochromanone in 120 ml of acetone are added 4.07 g of dimethyl sulfate and 6.6 g of anhydrous potassium carbonate, and the mixture is heated under refluxing for 80 minutes. After cooling, inorganic material is removed off by filtration, and the filtrate is evaporated to dryness under reduced pressure. The residue is shaken with a mixture of ethyl acetate and an aqueous sodium bicarbonate saturated solution, and the organic layer is evaporated to dryness under reduced pressure. The residue is recrystallized from ether - hexane to give 4.09 g (93% yield) of 7,8-dimethoxy-3-isochromanone having mp. 99° – 99.5°C. IR: $\nu_{max}^{Nujol}$ 1755 cm$^{-1}$. $\nu_{max}^{CHCl_3}$ 1740, 1590, 1268, and 1030 cm$^{-1}$. NMR: $\delta$ (CDCl$_3$) 3.63 (2H, singlet), 3.84 and 3.87 (6H, singlet), 5.36 (2H, singlet), and 6.98 (2H, singlet). Anal Calcd. for C$_{11}$H$_{12}$O$_4$ (%): C, 63.45; H, 5.81. Found (%): C, 63.38; H, 5.85.

EXAMPLE 5

To a solution of 1.0 g of 8-hydroxy-7-methoxy-3-isochromanone in 40 ml of acetone are added 5.9 ml of benzyl chloride and 4.0 g of potassium carbonate, and the mixture is heated under refluxing for 9 hours. After cooling, inorganic material is removed off by filtration, and the filtrate is evaporated to dryness under reduced pressure. The residue is recrystallized from petroleum ether to give 1.28 g (87% yield) of 8-benzyloxy-7-methoxy-3-isochromanone having mp. 81° – 82°C.

I claim:

1. A process for producing 3-isochromanone derivatives which comprises reacting a compound of the formula:

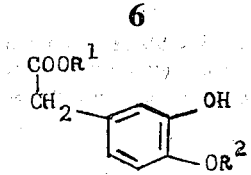

wherein R' represents hydrogen or lower alkyl and R$^2$ is lower alkyl with formaldehyde or with a compound, which under the conditions of the reaction, yields formaldehyde, said reaction being carried out in the presence of a boron compound selected from the group consisting of boric acids, boric acid esters, tetraalkoxyboranes, boronic acids, boroxines, acyloxyboranes, alkoxyboranes and alkoxyhaloboranes and then alkylating or aralkylating the product to yield a compound of the formula:

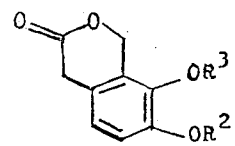

wherein R$^2$ has the same meaning as mentioned above, and R$^3$ represents lower alkyl or aralkyl.

2. A process according to claim 1, wherein the boron compound is a member selected from the group consisting of boric acid, boric acid esters, and boronic acids.

3. A process according to claim 1, wherein the boron compound is phenylboronic acid.

4. A process according to claim 1, wherein the compound, which under the conditions of reaction yields formaldehyde, is paraformaldehyde.

5. A process for producing 3-isochromanone derivatives which comprises reacting a compound of the formula:

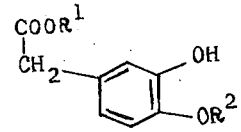

wherein R' represents hydrogen or lower alkyl and R$^2$ represents lower alkyl with formaldehyde or with a compound which, under the conditions of reaction yields formaldehyde, said reaction being conducted in the presence of a boron compound selected from the group consisting of boric acids, boric acid esters, tetraalkoxyboranes, boronic acids, boroxines, acyloxyboranes, alkoxyboranes, and alkoxyhaloboranes to yield a compound of the formula:

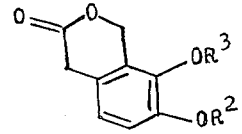

wherein R$^2$ has the same meaning as mentioned above, and R$^3$ is hydrogen.

6. A process according to claim 5, wherein the compound, which under the conditions of reaction yields formaldehyde, is paraformaldehyde.

7. A process according to claim 5, wherein the boron compound is a member selected from the group consisting of boric acid, boric acid esters, and boronic acids.

8. A process according to claim 5, wherein the boron compound is phenylboronic acid.

* * * * *